(12) United States Patent
Iwai et al.

(10) Patent No.: US 6,336,647 B1
(45) Date of Patent: Jan. 8, 2002

(54) FRONT WHEEL SUSPENSION IN A TWO-WHEELED VEHICLE

(75) Inventors: Toshiyuki Iwai; Takanori Aika; Shinji Ito, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/451,347

(22) Filed: Dec. 3, 1999

(30) Foreign Application Priority Data

Dec. 4, 1998 (JP) .......................................... 10-346097

(51) Int. Cl.[7] ................................................. B62K 1/00
(52) U.S. Cl. ........................ 280/276; 180/219; 280/277
(58) Field of Search ........................... 180/219; 280/276, 280/277

(56) References Cited

U.S. PATENT DOCUMENTS

| | | | | |
|---|---|---|---|---|
| 5,026,083 A | * | 6/1991 | Wendorf | 280/277 |
| 5,156,231 A | * | 10/1992 | Trema | 280/276 X |
| 5,165,712 A | * | 11/1992 | Fuller | 280/277 |
| 5,186,274 A | * | 2/1993 | Hegman | 280/277 |
| 5,855,388 A | * | 1/1999 | Brewer | 280/276 X |
| 5,899,478 A | * | 5/1999 | Woodside | 280/277 X |
| 5,931,487 A | * | 8/1999 | Koppelberg et al. | 280/276 |
| 6,017,047 A | * | 1/2000 | Hoose | 280/726 X |
| 6,112,841 A | * | 9/2000 | Iwai et al. | 280/277 |
| 6,152,472 A | * | 11/2000 | Woodside | 280/276 X |
| 6,155,370 A | * | 12/2000 | Iwai et al. | 280/277 X |
| 6,164,675 A | * | 12/2000 | Pickering | 280/277 |

FOREIGN PATENT DOCUMENTS

JP (Y2) 60-15744 5/1985

* cited by examiner

Primary Examiner—Lanna Mai
Assistant Examiner—Toan To

(57) ABSTRACT

A front wheel suspension in which a pin connects an upper link to a push rod. The push rod is also swingably connected to a front wheel supporting arm. The push rod is arranged such that the displacement gradient of the pin maintains a constant sign throughout a suspension stroke of the front wheel. This motion is accomplished by ensuring that an angle between an axis of a front fork and an axis connecting pivot points on the front wheel supporting arm is maintained at less than 90° throughout the suspension stroke.

9 Claims, 8 Drawing Sheets

FRONT WHEEL SUSPENSION IN A TWO-WHEELED VEHICLE

BACKGROUND OF THE INVENTION

1. Field of the Invention

The present invention relates to a front suspension for a two-wheeled vehicle in which a cushioning effect of the suspension is improved.

2. Background Art

Telescopic type suspensions, or bottom link type suspensions, are conventional in two-wheeled vehicles. A telescopic type suspension is capable of expansion and contraction like a telescope, and is suitable for a two-wheeled vehicle having a relatively small caster angle (the angle between a vertical line and front forks). In two-wheeled motor vehicles of large caster angle, also known as "American" type motorbikes, it is difficult to absorb vertical movements of a front wheel using a telescopic type suspension because the front forks extend horizontally. A bottom link type suspension is not overly influenced by the caster angle, and is therefore suitable for a two-wheeled motor vehicle having a large caster angle.

A conventional bottom link type suspension is shown in Japanese Utility Model Publication No. Sho 60-15744, entitled "A Front Wheel Suspension in a Two-wheeled Vehicle." According to this suspension, as shown in FIGS. 1 and 2 of the publication, a front wheel W is suspended by parallel links (reference numerals 3, 8, 6 and F), a hydraulic damper (not shown) and a suspension coil spring 14. The suspension shown in FIG. 1 is a leading type suspension, because an axle 5 of the front wheel W is located ahead of the suspension, while the suspension shown in FIG. 2 of the publication is a trailing type suspension, because the front wheel axle 5 is located behind the suspension.

In FIG. 1 of the publication, when a brake is applied to the front wheel, the front wheel W rises relatively with respect to a vehicle body frame, and jumping results in a relative descent of the front wheel W. Thus, a large suspension stroke results. In the same figure, the angle between a leading arm 3 and a link 8 is approximately 90°. As the front wheel W descends relatively, the angle becomes larger than 90°, while with a relative ascent of the front wheel W, the angle becomes smaller than 90°. Also in the above FIG. 2, the angle between the leading arm 3 and the link 8 is approximately 90°, which angle increases and decreases above and below 90°. This angular change will be explained below with reference to FIG. 7 of the present application.

FIG. 7 of the present application is a schematic diagram of FIG. 2 of Japanese Utility Model Publication No. Sho 60-15744, showing the principle elements of a conventional bottom link type suspension. The leading arm as referred to in the publication is here denoted a front wheel supporting arm 103, which is a trailing arm. One end of the front wheel supporting arm 103 is connected to a lower end of a front fork 101 and is swingable through a first pin 102, an axle 105 of a front wheel 104 is secured to the opposite end of the front wheel supporting arm 103. A lower end of a push rod 107 is connected to an intermediate position of the front wheel supporting arm 103 through a second pin 106. An upper link 109 extends from an upper portion of the front fork 101 through a third pin 108, and an upper end of the push rod 107 is connected to an intermediate position of the upper link 107 through a fourth pin 110. An end of the upper link 109 opposite to the front fork side is connected to a lower end of a suspension spring 111. Thus, the front wheel 104 is suspended by a parallel link structure.

An axis passing through both first and second pins 102, 106 is a first axis 103A, an axis passing through both second and fourth pins 106, 110 is a second axis 107A, and the angle on the front fork 101 side between the first axis 103A and the second axis 107A is the angle ψ, which increases and decreases with upward and downward movements of the front wheel 104. That is, when the axle 105 moves from 1 to 2, the angle ψ becomes large, while when the axle 105 moves from 1 to 3, the angle ψ becomes small. In many cases ψ changes in the range of 70° to 110° on both sides of 90°.

Taking note of a vertically upward movement of the fourth pin 110, it is seen that in the region where the angle ψ is smaller than 90°, the amount of upward displacement of the fourth pin increases as the angle approaches 90°, while in the region where the angle ψ exceeds 90°, the amount of upward displacement of the fourth pin 110 decreases as the angle ψ becomes larger than 90°. As a sine curve, with the angle of 90° as its peak angle, the amount of an upward displacement of the fourth pin 110 decreases before and after the peak angle of 90°.

FIG. 8 of the present application is an illustration of the axes shown in FIG. 7. The distance from a horizontal axis Ha which passes through the first pin 102 up to the fourth pin 110 is "H", and the distance from the horizontal axis Ha to the second pin 106 is "h". The length of the first axis 103A is "r" and the inclination angle thereof is "ψ2", the length of the second axis 107A is "R", and the inclination angle thereof is "ψ1", with ψ defined by ψ=ψ1+ψ2. The following expressions are therefore established:

$$\psi = \psi 1 + \psi 2$$

$$R \cos \psi 1 = H + h$$

$$h = r \cos \psi 2$$

$$H = R \cos \psi 1 - r \cos \psi 2 \qquad \text{eqn. (4)}$$

$$H' = -R \sin \psi 1 + r \sin \psi 2 \qquad \text{eqn. (5)}$$

$$\sin \psi 2 = \sin(\psi - \psi 1) = \sin \psi \cos \psi 1 - \cos \psi \sin \psi 1 \qquad \text{eqn. (6)}$$

If ψ=90°, sin ψ=1, cos ψ=0 sin ψ2=cos ψ1 H'=−R sin ψ1+r cos ψ1 eqn. (7)

As shown in the above equation (4), the distance H becomes a function of R, r, ψ1 and ψ2.

A rate of change of H can be determined by differentiation. The result of the differentiation is as shown in the above equation (5). sin ψ2 is defined according to equation (6).

As noted above, the angle ψ has heretofore been approximately 90°, so if the angle ψ is assumed equal to 90°, H' can be approximated by equation (7), and it becomes a function of R, r and ψ1.

FIG. 9 of the present application is a graph showing R sin ψ1 and r cos ψ1 plotted with respect to ψ1 along the axis of abscissa, according to a conventional suspension. The angle ψ1 becomes (ψ−ψ2) and it is presumed that there is a change at around a half of ψ, i.e., 45°. The sine curve and the cosine curve intersect each other at an angle of between 0° and 90°. If this intersecting point is assumed to be M, R sin ψ1 is larger than r cos ψ1 on the 90°+side with respect to the intersecting point M, so that the above equation (7) becomes negative in sign (−). In the 0°–90° side with respect to the intersecting point M, R sin ψ1 becomes smaller than r cos ψ, so that the above equation (7) becomes positive in sign (+).

Thus, if the angle ψ is near 90° and if H' is positive, the fourth pin 110 rises while being accelerated, while if H is negative, the fourth pin rises while being decelerated. Thus, if a peak in the amount of displacement or a point of change between acceleration and deceleration is present intermediate to the vertically moving stroke of the front wheel, a cushion feeling having a sense of incongruity results.

According to the conventional art, such incongruity sense is absorbed by a suspension spring. To this end, however, a special spring whose spring coefficient varies according to the amount of compression (for example, a spring different in diameter depending position, or a multi-stage spring) must be used as the suspension spring, thus leading to an increase in cost of the suspension spring.

It is therefore an object of the present invention to provide a front wheel suspension in which a peak is not contained in a displacement ratio of the upper end of the push rod.

SUMMARY OF THE INVENTION

The present invention achieves the above object and other advantages not contemplated by the conventional art.

A front wheel suspension according to an embodiment of the present invention is a bottom link type suspension in a two-wheeled vehicle, in which a front wheel supporting arm is connected to a front fork swingably through a first pin. An axle of a front wheel is mounted to an end portion of the front wheel supporting arm, a lower end of a push rod is connected to an intermediate position of the front wheel supporting arm through a second pin, with the push rod being extended upward. An upper end of the push rod is connected through a third pin to an upper link, which is connected to a bottom bridge swingably through a fourth pin. The upper link is connected to a lower end of a suspension spring through a fifth pin.

An axis connecting the first pin on the front fork side with the second pin mounted at an intermediate position of the front wheel supporting arm is assumed to be a first axis, and an axis connecting the second pin at an intermediate position of the front wheel supporting arm with the third pin on the upper link side is assumed to be a second axis. The smaller of the two angles between the first and second axes is assumed to be θ. A link is constituted so that the angle θ is maintained in a range not exceeding 90° throughout the whole region of a suspension stroke of the front wheel.

If the smaller of the angles between the first and second axes is assumed to be θ, and if the angle θ is maintained in a range not exceeding 90° throughout the whole region of a suspension stroke of the front wheel, the amount of a vertical displacement of the third pin can be varied in a substantially linear manner, thus permitting the use of a less expensive suspension spring.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention will be described with reference to the accompanying drawings. In the description, "front", "rear", "left", "right", "upper", and "lower" represent directions as seen from the rider's position.

Figure 1:
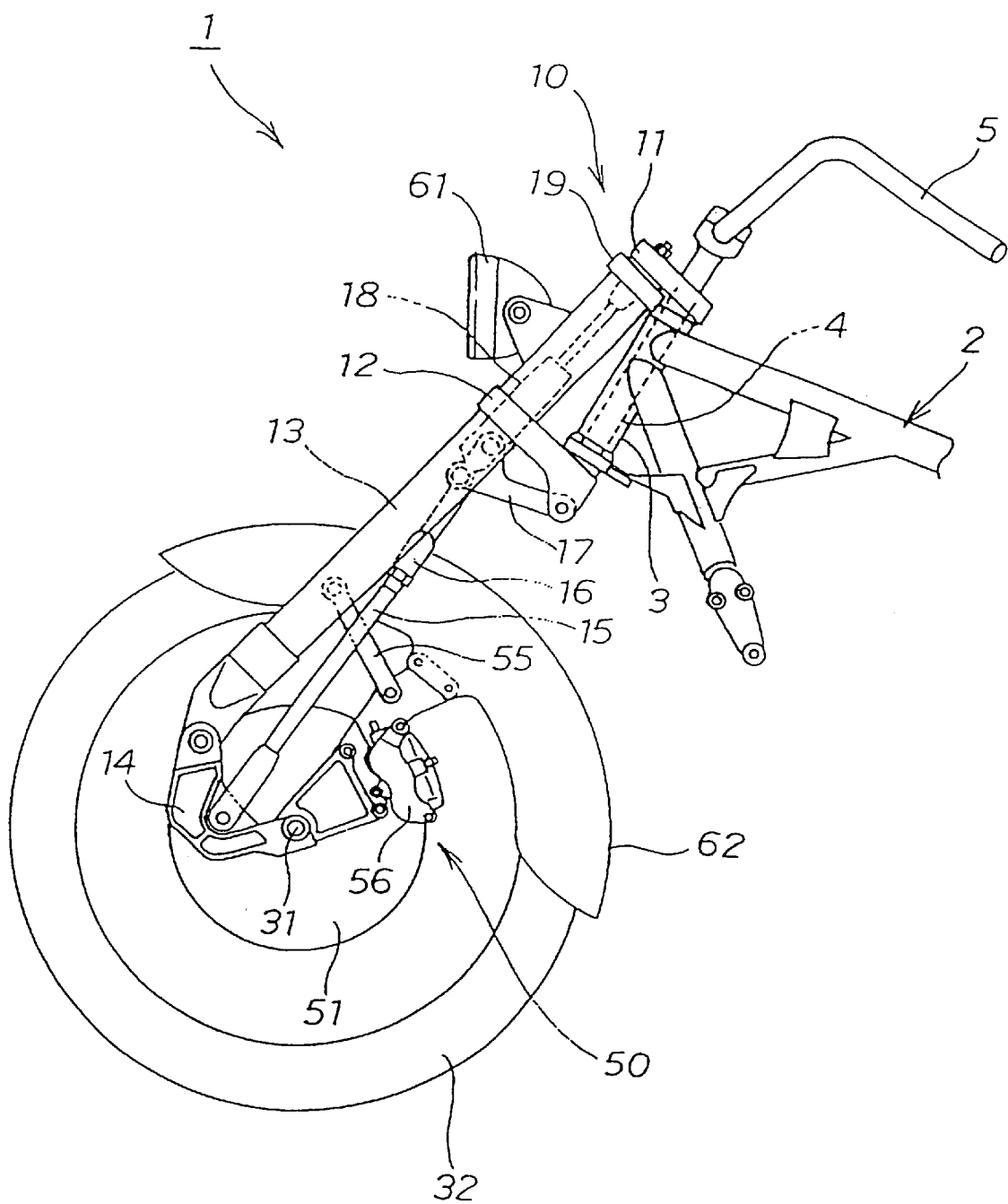
FIG. 1 is a side view showing a front half portion of a two-wheeled motor vehicle according to the present invention.

FIG. 1 is a side view of a front portion of a two-wheeled motor vehicle according to the present invention. In the two-wheeled motor vehicle 1, a vertical steering stem 4 is fitted in a head pipe 3 of a body frame 2 so as to be rotatable to the right and left. A top bridge 11 is mounted to an upper portion of the steering stem 4, a handle bar 5 is mounted to the top bridge 11, and a front wheel suspension 10 of a bottom link type is attached to the steering stem 4.

A front brake 50 of the two-wheeled motor vehicle 1 is a hydraulic disc brake which includes a brake disc 51 attached to the front wheel 32 and calipers 56 for controlling a braking action of the brake disc 51. Numeral 61 denotes a head lamp and numeral 62 denotes a front fender.

Figure 2:
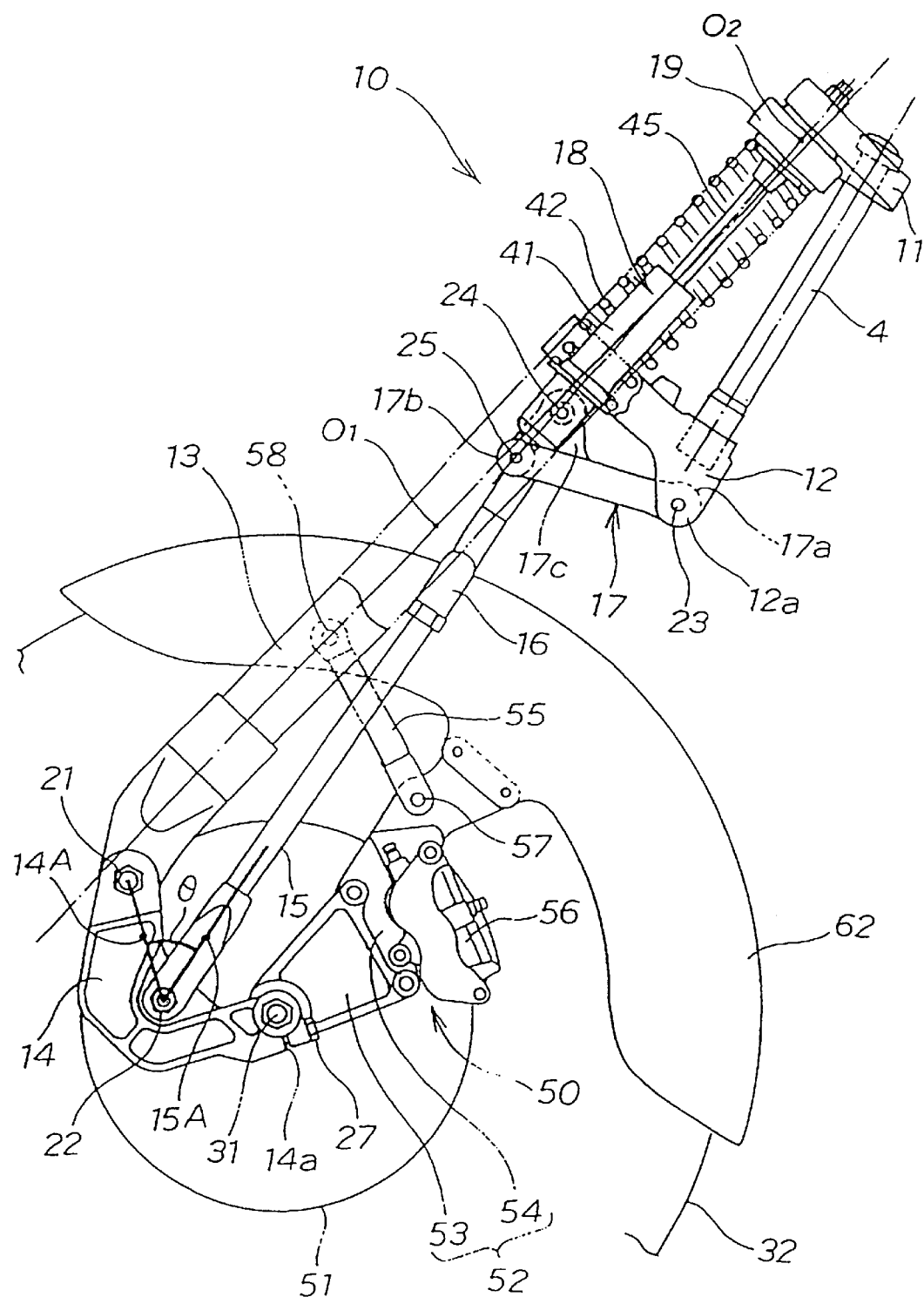
FIG. 2 is a side view of a front wheel suspension according to the present invention.

FIG. 2 is a side view of the front wheel suspension according to the present invention. The front wheel suspension 10, which is a trailing arm type suspension, includes a top bridge 11 mounted to the upper portion of the steering stem 4, a bottom bridge 12 mounted to a lower portion of the steering stem 4, and a front fork 13 whose upper end portion is mounted to the top and bottom bridges 11, 12. A front wheel supporting arm 14 has a front end portion which is connected vertically swingably to a lower end portion of the front fork 13, which extends forward and downward. A push rod 15 whose lower end portion is connected longitudinally swingably to an intermediate position of the front wheel supporting arm 14 extends backward and upward. An upper link 17 extends forward from the bottom bridge 12 vertically swingably for connection through a rod hanger 16 with an upper end portion of the push rod 15. A shock absorber 18 has a lower end portion which is connected to the upper link 17, and an upper bracket 19 is attached to the upper end portion of the front fork 13, and is connected with an upper end portion of the shock absorber 18, which extends upward.

A first pin 21 connects the front wheel supporting arm 14 swingably to the front fork 13. A second pin 22 connects the lower end of the push rod 15 swingably to an intermediate position of the front wheel supporting arm 14. A fourth pin 23 connects a rear portion of the upper link 17 to a connecting portion 12a of the bottom bridge 12. A third pin 24 connects the upper end of the push rod 15, more particularly an upper end of the rod hanger 16, to a front portion of the upper link 17. A fifth pin 25 connects the front portion of the upper link 17 to the lower end portion of the shock absorber 18.

An axis connecting the first pin 21 with the second pin 22 is designated as first axis 14A, an axis connecting 13 the second pin 22 with the third pin 24 is designated a second axis 15A, and the smaller of the two angles between the first and second axes 14A, 15A is defined to be θ.

Since the front suspension is a trailing arm type suspension, a front wheel axle 31 is secured to a rear end portion of the front wheel supporting arm 14, and a front wheel 32 is mounted onto the axle 31.

The front wheel suspension 10 has the following properties when viewed from the side of the vehicle: (1) the front fork 13 is disposed in front of the steering stem 4, and the angle of inclination of the front fork 13 is larger than that of the steering stem 4, and, (2) a center $O_2$ of the shock absorber 18 is substantially aligned with a center $O_1$ of the front fork 13.

The shock absorber 18 is a spring outside type shock absorber which comprises a hydraulic damper 41 and a suspension spring 42 wound round the damper 41. As is apparent from FIG. 2, an outside diameter of the suspension spring 42, which is a maximum diameter of the shock absorber 18, is approximately equal to the diameter of the front fork 13.

A bracket 52 is mounted to the axle 31 so as to be swingable vertically. The bracket 52 comprises a first bracket 53 mounted on the axle 31 and a second bracket 54 attached to an end portion of the first bracket 53 on the side opposite the axle 31. An end portion of the second bracket 54 on the side opposite to the first bracket 53 is connected to a longitudinally intermediate part of the front fork 13 through a torque transfer link 55. The second bracket 54 is used for mounting the calipers 56 and a front fender 62. Both ends of the torque transfer link 55 are vertically swingably connected respectively to the front fork 13 with a connecting pin 58 and to the second bracket 54 with a connecting pin 57. The torque transfer link 55 therefore prevents the rotation of the bracket 52.

Figure 3:
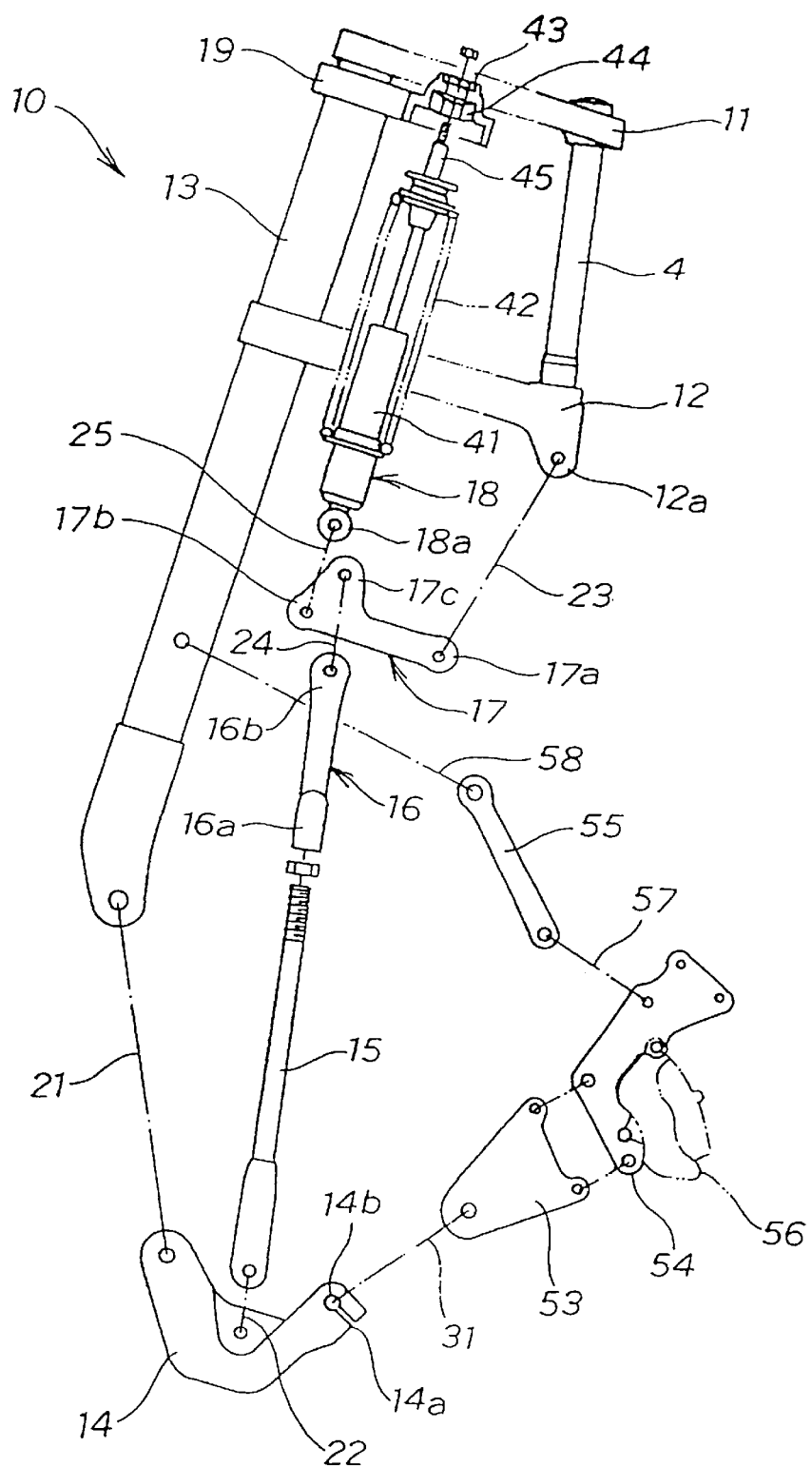
FIG. 3 is an exploded side view of a front wheel suspension according to the present invention.

FIG. 3 is an exploded side view of the front wheel suspension 10. The connecting portion 12a is formed at a lower end of the bottom bridge 12, a rear-end connecting portion 17a of the upper link 17 (also called a "crank") is connected vertically swingably to the connecting portion 12a. A lower end portion 18a of the shock absorber 18 is connected vertically swingably to a front-end connecting portion 17b of the upper link 17, and an upper connecting portion 16b of the rod hanger 16 is connected vertically swingably to an intermediate connecting portion 17c of the upper link 17. The intermediate connecting portion 17c is formed at a longitudinally intermediate position of the upper link 17 at a position higher than the front end connecting portion 17b.

Figure 4:
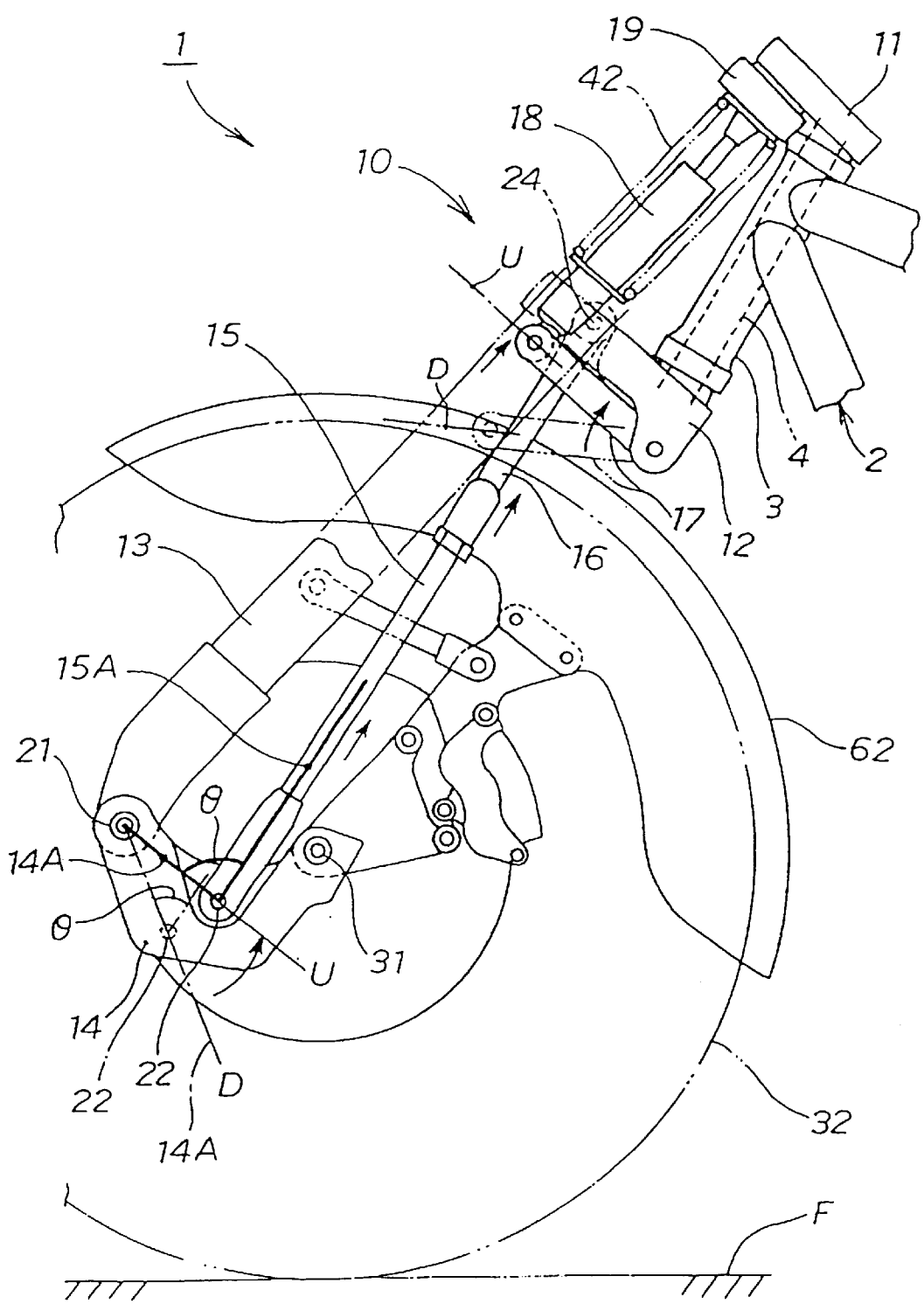
FIG. 4 is a diagram illustrating the operation of a front wheel suspension according to the present invention.

FIG. 4 shows the operation of the front wheel suspension. D is a link position with the front wheel 32 lying in a lower-limit position, and U is a link position with the front wheel 32 lying in an upper-limit position. In the front wheel suspension 10, the first axis 14A (indicated by an imaginary line) swings counterclockwise to a second location of the first axis 14A (indicated by a solid line) to absorb relative rising and falling motions of the front wheel 32. As the front wheel supporting arm 14 rises (turns) in the direction of the curved arrow, the push rod 15 rises, the upper link 17 then turns clockwise, and the hydraulic damper 41 and the suspension spring 42 contract, thereby absorbing shock energy. Taking note of vertical movements of the third pin 24, it is seen that there is a relation between a change of the angle θ and the vertical movements of the third pin.

Figure 5B:
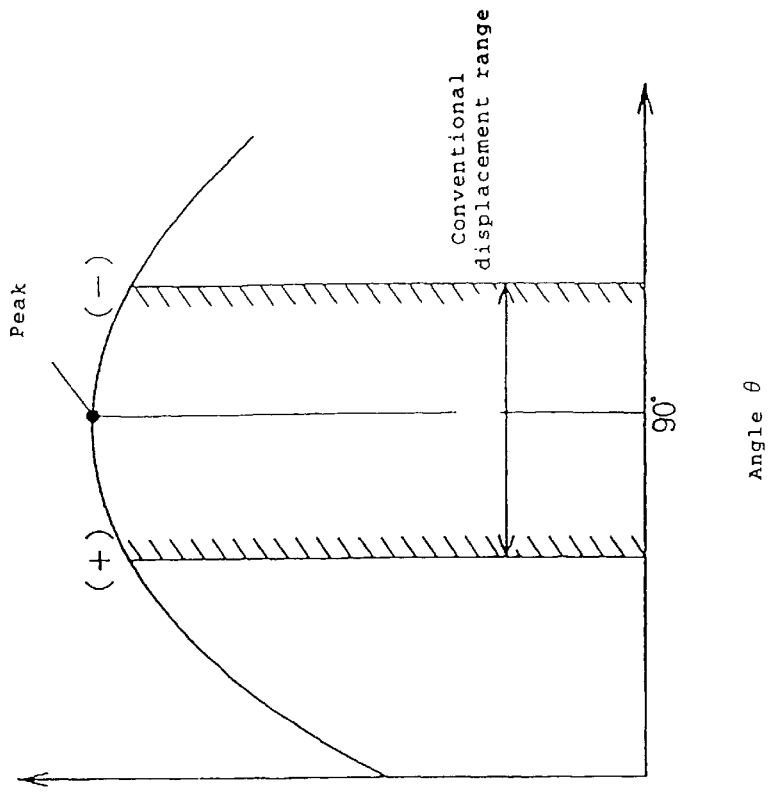
FIG. 5b is a graph showing the displacement of a connection pin in a conventional suspension.
Figure 5A:
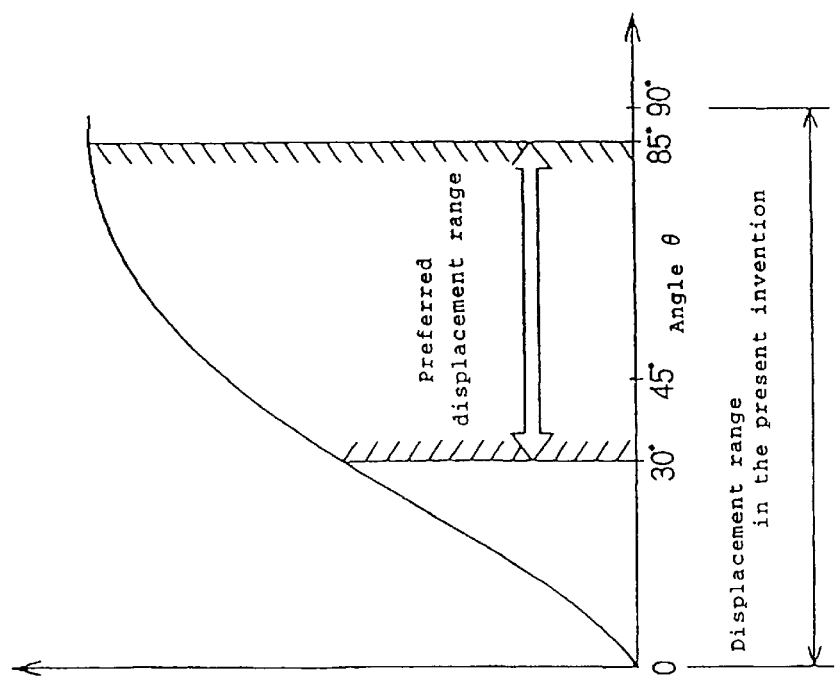
FIG. 5a is a graph showing the displacement of a fourth pin in a front wheel suspension according to the present invention.

FIG. 5(a) is a graph showing the displacement of the third pin 24 used in the front wheel suspension according to the present invention. FIG. 5(b) is a graph showing a comparative example of the motion of a connection pin in a conventional suspension. In both graphs, the axis of abscissa represents the angle θ, and the axis of ordinate represents the amount of displacement of the third pin with respect to θ.

In FIG. 5(a) the angle θ is set so as not to exceed 90°, and therefore the amount of displacement of the third pin 24 describes a curve of a rising gradient (a nearly straight line or a gently curved quadratic curve). If the lower end of the suspension spring is connected to the third pin 24 and the suspension spring is a simple spring having a constant spring coefficient, the repulsive force of the suspension spring increases in a nearly linear manner or as a gently curved quadratic, as the angle θ increases. This phenomenon accords with a progressive link action (an action of the suspension force being enhanced more and more as the wheel rises), which is desirable. That is, this embodiment permits the adoption of a very simple spring as the suspension spring.

As to the angle θ, any value may be adopted insofar as it does not depart from the range of 0° to 90° throughout the whole region of the front wheel stroke. However, when a mounting error or the like is taken into account, it is desired that a margin of 5° or so be given on the 90° side and that the angle be larger than 30° in order to maintain the practical construction of the link. Therefore, the angle θ is preferably in the range of 30° to 85°.

FIG. 5(b) is a graph of connection pin displacement in a conventional suspension. The angle θ varies on both sides of 90°, with a peak present at or about 90°, and the gradient of the plot reverses sign before and after the peak. When the gradient changes as in this figure, a special spring is required whose spring coefficient varies according to the amount of compression. Such a special spring is expensive and difficult to design.

Figure 6:
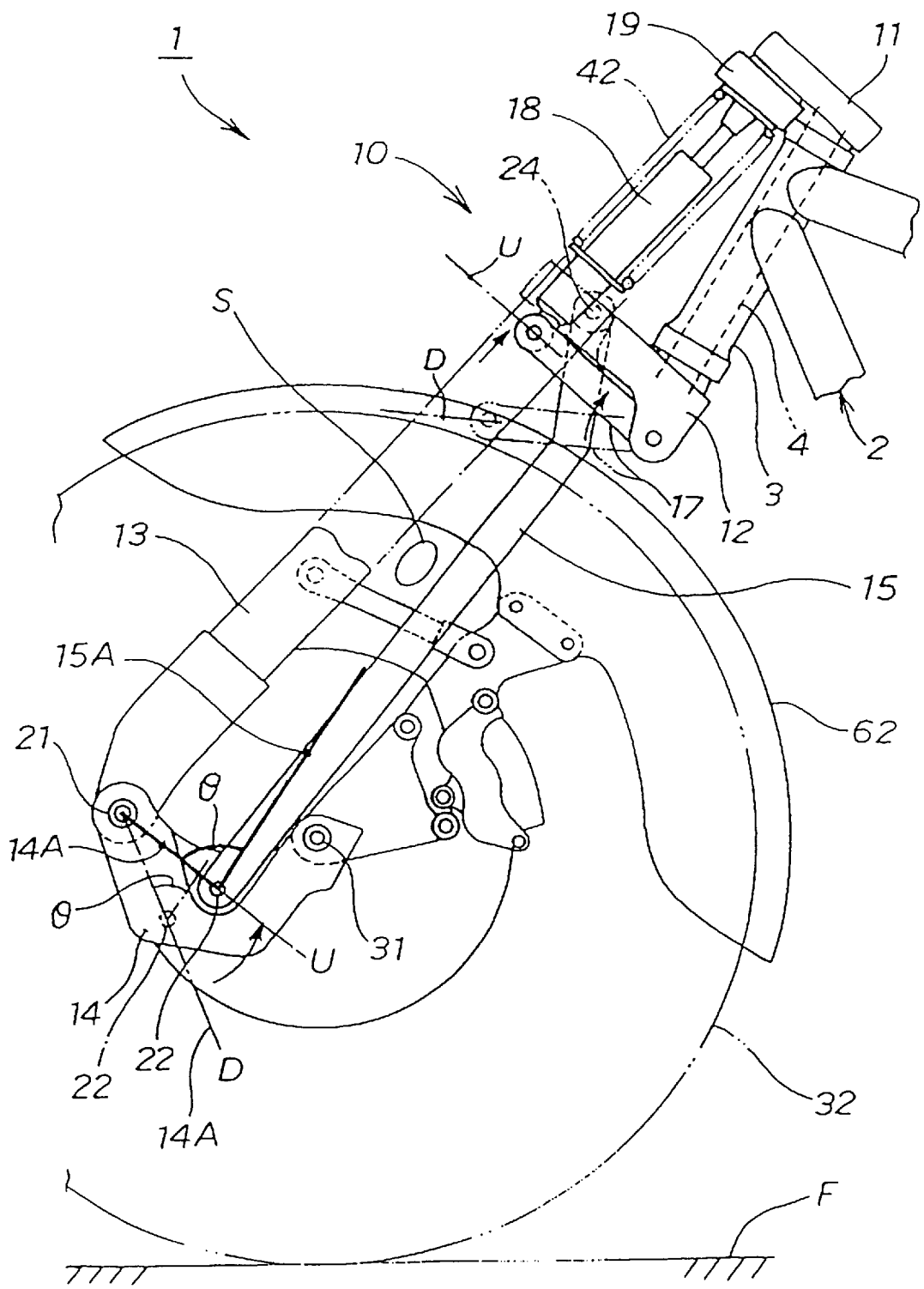
FIG. 6 is a side view of a second embodiment of a suspension according to the present invention.
Figure 7:
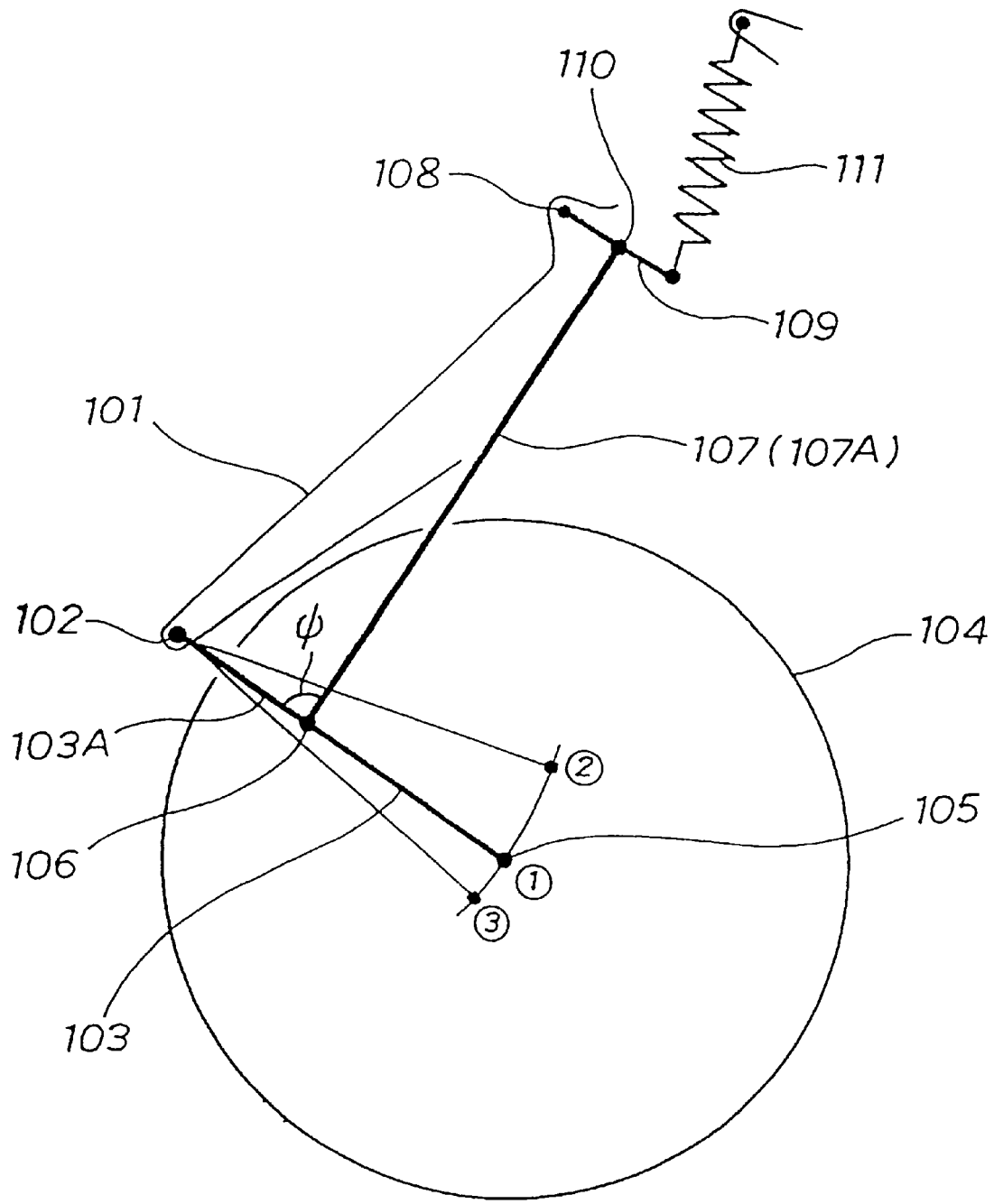
FIG. 7 is a schematic diagram of a conventional bottom link type suspension.
Figure 8:
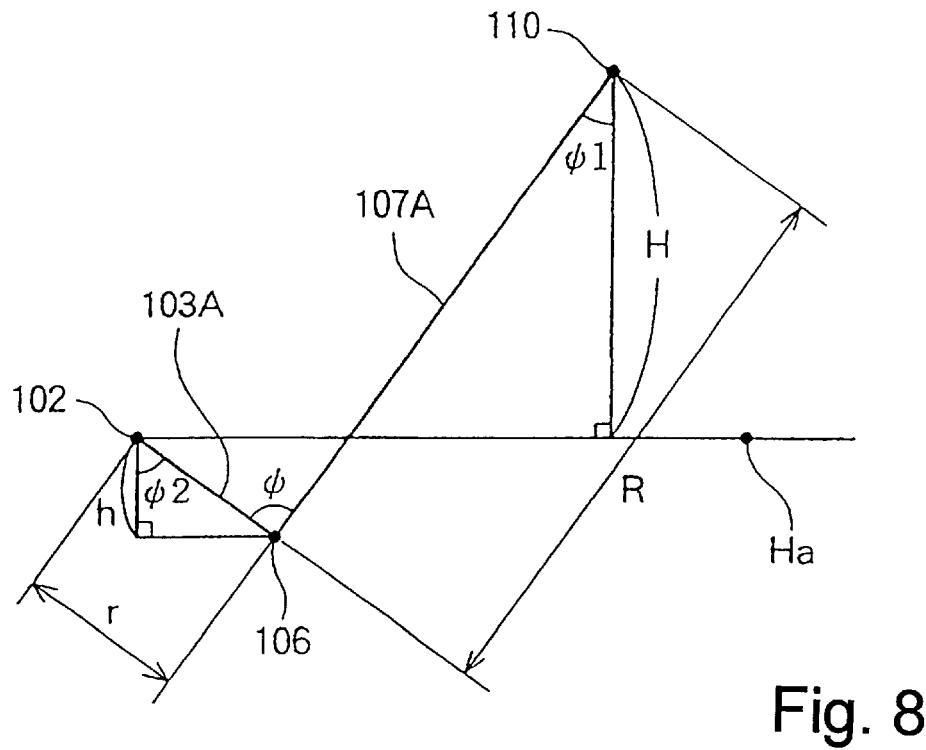
FIG. 8 shows the relationship of the first and second axes shown in FIG. 7.
Figure 9:
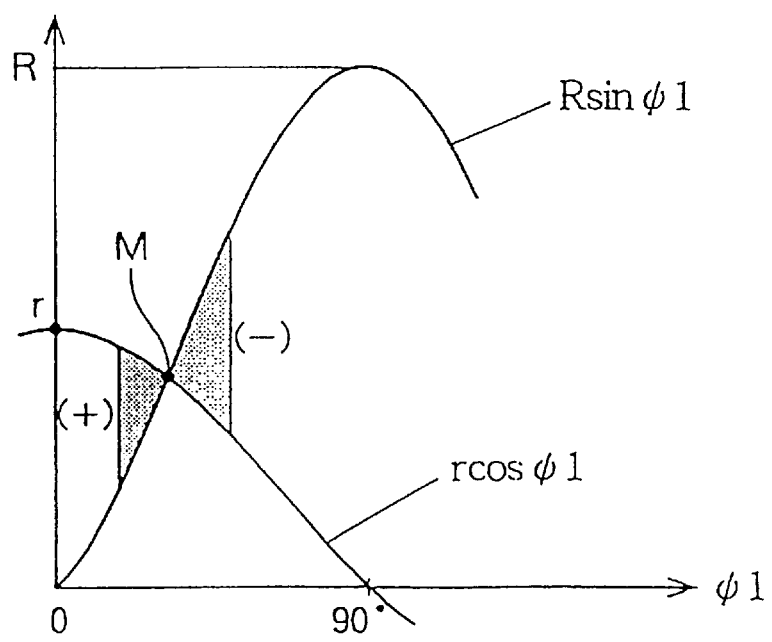
FIG. 9 is a graph showing a sine curve and a cosine curve.

FIG. 6 illustrates a second embodiment according to the present invention. In FIG. 4, a push rod 15 includes a curved portion. This permits a space S to be included between the push rod and the front fork 13, and devices and parts used around the front wheel can be disposed within the space S. A second axis 15A extending from the second pin 22 toward the fourth pin 24 is the same as in FIG. 4.

Consequently, the shape of the push rod 15 can be set freely while keeping the angle θ inside of 90°. For example, the shape of the push rod 15 can be determined so as to enhance the steering feeling or to include a space S, and hence the freedom of design for the front wheel suspension can be enhanced. Although the front wheel suspension of the present invention is suitable for a two-wheeled motor vehicle, it is also applicable to a two-wheeled vehicle (e.g., a bicycle) without an engine.

When the smaller of the two angles between the first and second axes is assumed to be θ, the angle θ is kept in a range not exceeding 90° throughout the whole suspension stroke of the front wheel, and the amount of vertical displacement of the third pin can be varied in a substantially linear manner. If a peak is included in the amount of displacement of the third pin, it is necessary to adopt a special suspension spring. In the present invention, such a peak is not present because the amount of displacement of the fourth pin is varied in a substantially linear manner. As a result, it becomes possible to adopt a less expensive suspension spring, and it is possible to reduce the number of design steps for the suspension spring and the front wheel suspension.

It is expressly stated that the first and second axes form angle θ when viewed from the side of the two-wheeled vehicle, and that the first and second axes need not actually intersect in order to form angle θ.

The invention being thus described, it will be obvious that the same may be varied in many ways. Such variations are not to be regarded as a departure from the spirit and scope of the invention, and all such modifications would be obvious to one skilled in the art are intended to be included within the scope of the following claims.

What is claimed is:

1. A front wheel suspension for a vehicle comprising:
   a front fork;
   a front wheel supporting arm swingably connected to the front fork at a first pivot;
   a push rod swingably connected at one end to the front wheel supporting arm at a second pivot, and at another end to an upper link at a third pivot; and
   a front wheel having an axle, the axle being mounted to the front wheel supporting arm; wherein
   a first axis intersects the first pivot and the second pivot, a second axis intersects the second pivot and the third pivot, and the first and second axes form two angles, one smaller than the other; and wherein
   the front wheel undergoes a suspension stroke during operation of the vehicle, the smaller of the two angles being maintained at an angle of less than about 90° during the suspension stroke.

2. The suspension of claim 1, wherein the first pivot is located at first end of the front wheel supporting arm, and the front wheel is mounted to a second end of the front wheel supporting arm.

3. The suspension of claim 2, wherein the second pivot is located at an intermediate portion of the front wheel supporting arm.

4. The suspension of claim 1, further comprising:
   a bracket mounted to the axle; and
   a torque transfer link, the torque transfer link being swingably connected at one end to the bracket, and swingably connected at another end to the front fork.

5. The suspension of claim 4, further comprising:
   calipers for controlling a braking action of the vehicle, the calipers being mounted on the bracket.

6. The suspension of claim 1, wherein the push rod includes a curved portion.

7. A two-wheeled vehicle, comprising;
   a suspension, including:
      a front wheel supporting arm swingably connected to the front fork at a first pivot;
      a push rod swingably connected at one end to the front wheel supporting arm at a second pivot, and at another end to an upper link at a third pivot;
      a bottom bridge, the bottom bridge being swingably connected to the upper link at a fourth pivot;
      a shock absorber, the shock absorber being swingably connected to the upper link at a fifth pivot; and
      a front wheel having an axle, the axle being mounted to the front wheel supporting arm; wherein
      a first axis intersects the first pivot and the second pivot, a second axis intersects the second pivot and the third pivot, and the first and second axes form two angles, one smaller than the other; and wherein
      the front wheel undergoes a suspension stroke during operation of the vehicle, the smaller of the two angles being maintained at an angle of less than about 90° during the suspension stroke;
   a head pipe connected to the bottom bridge at an upper portion of the bottom bridge;
   a steering stem rotatably supported in the head pipe; and
   a handle bar connected to the steering stem, the handle bar allowing an operator to steer the vehicle.

8. The vehicle of claim 7, wherein the upper link includes:
   a front-end connecting portion, the fifth pivot connecting the upper link to the shock absorber at the front-end connecting portion; and
   an intermediate connecting portion, the third pivot connecting the upper link to the push rod at the intermediate connecting portion.

9. A front wheel suspension for a vehicle comprising:
   a front fork;
   a front wheel supporting arm swingably connected to the front fork at a first pivot;
   a push rod swingably connected at one end to the front wheel supporting arm at a second pivot, and at another end to an upper link at a third pivot; and
   a front wheel having an axle, the axle being mounted to the front wheel supporting arm; wherein
   a first axis intersects the first pivot and the second pivot, a second axis intersects the second pivot and the fourth pivot, and the first and second axes form two angles, one smaller than the other; and wherein
   the front wheel undergoes a suspension stroke during operation of the vehicle, and the fourth pivot undergoes a displacement during the suspension stroke, the displacement of the fourth pivot being a function of the change in the smaller angle during the suspension stroke, and, the slope of the displacement curve of the fourth pivot with respect to the change in the smaller angle having a constant sign during substantially the entire suspension stroke.

* * * * *